United States Patent [19]

Kramer et al.

[11] Patent Number: 5,512,241
[45] Date of Patent: Apr. 30, 1996

[54] AL-CU-LI WELD FILLER ALLOY, PROCESS FOR THE PREPARATION THEREOF AND PROCESS FOR WELDING THEREWITH

[75] Inventors: Lawrence S. Kramer, Clarksville; Joseph R. Pickens, Glenelg, both of Md.; Carl E. Cross, Idaho Springs, Colo.

[73] Assignee: Martin Marietta Corporation, Bethesda, Md.

[21] Appl. No.: 226,816

[22] Filed: Apr. 13, 1994

Related U.S. Application Data

[63] Continuation-in-part of Ser. No. 103,662, Aug. 10, 1993, Pat. No. 5,455,003, which is a continuation-in-part of Ser. No. 32,158, Mar. 12, 1993, abandoned, which is a continuation of Ser. No. 493,255, Mar. 14, 1990, abandoned, which is a continuation-in-part of Ser. No. 327,666, Mar. 23, 1989, Pat. No. 5,259,897, which is a continuation-in-part of Ser. No. 233,705, Aug. 18, 1988, abandoned.

[51] Int. Cl.⁶ .......................... C22C 21/00; C22C 21/12
[52] U.S. Cl. .......................... 420/528; 148/516; 148/524; 148/689; 148/437; 148/438; 148/439; 420/529; 420/531; 420/532; 420/533; 420/539; 420/540; 420/542; 420/552; 420/553
[58] Field of Search .................. 420/528, 529, 420/531, 532, 533, 539, 540, 542, 552, 553; 148/516, 524, 437, 438, 439, 689

[56] References Cited

U.S. PATENT DOCUMENTS

| | | | |
|---|---|---|---|
| 2,381,219 | 8/1945 | LeBaron | 420/529 |
| 2,915,391 | 12/1959 | Criner | 148/439 |
| 3,306,717 | 2/1967 | Lindstrand | 420/534 |
| 4,094,705 | 6/1978 | Sperry et al. | 148/439 |
| 4,526,630 | 4/1985 | Field | 148/700 |
| 4,624,717 | 11/1986 | Miller | 148/415 |
| 4,648,913 | 3/1987 | Hunt, Jr. et al. | 148/415 |
| 4,752,343 | 6/1988 | Dubost et al. | 148/417 |
| 4,758,286 | 7/1988 | Dubost et al. | 148/417 |
| 4,772,342 | 9/1988 | Polmear | 148/418 |
| 4,795,502 | 1/1989 | Cho | 148/417 |
| 4,806,174 | 2/1989 | Cho et al. | 148/415 |

(List continued on next page.)

FOREIGN PATENT DOCUMENTS

| | | |
|---|---|---|
| 0158571 | 10/1985 | European Pat. Off. |
| 0273600 | 7/1988 | European Pat. Off. |
| 2134925 | 8/1984 | United Kingdom |
| 91-11540 | 8/1991 | WIPO |
| 9111540 | 8/1991 | WIPO |

OTHER PUBLICATIONS

"Registration Record of Aluminum Association Designations and Chemical Composition Limits for Wrought Aluminum and Wrought Aluminum Alloys", Revised Jan. 1989, The Aluminum Association, Inc., pp. 2–8+12–15.

"Aging Phenomena of Al–Li–Mg Alloy Affected by Additional Elements", Hayashi, et al., Journal Of Japan Institute of Light Metals, vol. 32, No. 7, Jul. 1982, pp. 350–355.

"Recent Developments in the Weldability of Lithium–Containing Aluminum Alloys", Journal of Materials Science, Joseph R. Pickens, Martin Marietta Laboratories, 1990, Chapman & Hall, Ltd., vol. 25, pp. 3035–3047.

"The Weldability of Lithium–Containing Aluminum Alloys", Journal of Material Science, J. R. Pickens, Martin Marietta Laboratories, 1985 Chapman & Hall, Ltd., vol. 20, pp. 4247–4258.

(List continued on next page.)

Primary Examiner—David A. Simmons
Assistant Examiner—Robert R. Koehler
Attorney, Agent, or Firm—Gay Chin; Brian J. Rees; Alan G. Towner

[57] ABSTRACT

Weld filler alloys comprising aluminum, copper, lithium and, optionally, silver are disclosed which possess significantly improved fabricability and weldability. The weld filler alloys are free of magnesium and can be easily drawn into weld wire that is useful for welding aluminum-base alloys. Weldments made with the filler alloys exhibit highly improved mechanical, physical and corrosion resistance properties. The weld filler alloys may be used to weld cryogenic containers for space launch vehicles and the like.

37 Claims, 4 Drawing Sheets

U.S. PATENT DOCUMENTS

| | | | |
|---|---|---|---|
| 4,812,178 | 3/1989 | Dubost | 148/415 |
| 4,816,087 | 3/1989 | Cho | 148/415 |
| 4,832,910 | 5/1989 | Rioja et al. | 420/528 |
| 4,840,682 | 6/1989 | Curtis et al. | 148/415 |
| 4,840,683 | 6/1989 | Dubost | 148/417 |
| 4,848,647 | 7/1989 | Gentry et al. | 420/532 |
| 4,869,870 | 9/1989 | Rioja et al. | 420/532 |
| 5,032,359 | 7/1991 | Pickens et al. | 420/533 |
| 5,122,339 | 6/1992 | Pickens et al. | 420/533 |
| 5,137,686 | 8/1992 | Rioja et al. | 420/528 |
| 5,151,136 | 9/1992 | Witters et al. | 148/689 |
| 5,211,910 | 5/1993 | Pickens et al. | 420/532 |
| 5,259,897 | 11/1993 | Pickens et al. | 148/417 |

OTHER PUBLICATIONS

"Weldability of Commercial Aluminum–Lithium Alloys", J. C. Lippold, Proceedings of the Aluminum–Lithium V Conference, 1989, pp. 1365–1375.

"Welding of Lightweight Aluminum–Lithium Alloys: Information on the Welding of Various Aluminum–Lithium Alloys is Reviewed", T. S. Srivatsan and T. S. Sudarshan, Welding Research Supplement, Jul. 1991, pp. 173–s–185–s.

Kramer, L. S. and Pickens, J. R., Microstructure and Properties of a Welded Al–Cu–Li Alloy, *Welding Journal* pp. 115s–121s (Apr. 1992), U.S.

AL-CU-LI WELD FILLER ALLOY, PROCESS FOR THE PREPARATION THEREOF AND PROCESS FOR WELDING THEREWITH

CROSS REFERENCE TO RELATED APPLICATIONS

This application is a continuation-in-part of U.S. patent application Ser. No. 08/103,662, filed Aug. 10, 1993, now U.S. Pat. No. 5,455,003, which is a continuation-in-part of U.S. patent application Ser. No. 08/032,158, filed Mar. 12, 1993, now abandoned, which is a continuation of U.S. application Ser. No. 07/493,255, filed Mar. 14, 1990, now abandoned, which is a continuation-in-part of U.S. patent application Ser. No. 07/327,666, filed Mar. 23, 1989, now U.S. Pat. No. 5,259,897, which is a continuation-in-part of U.S. patent application Ser. No. 07/233,705, filed Aug. 18, 1988, now abandoned.

FIELD OF THE INVENTION

The present invention relates to weld filler alloys comprising aluminum, copper and lithium that possess improved fabricability and weldability. The weld filler alloys can be easily drawn into weld wire and are useful for welding aluminum-base alloys such as Al—Cu, Al—Li, Al—Cu—Li and Al—Cu—Li—Mg alloys. The present invention also relates to a method for fabricating weld wire of improved composition, and a method for welding using the improved Al—Cu—Li weld filler alloys. The invention further relates to a method for welding a cryogenic container using the improved weld filler alloys.

BACKGROUND OF THE INVENTION

Aluminum and its alloys have long been known to have desirable properties such as low cost, relatively low density and corrosion resistance. Aluminum alloys are widely used in aerospace applications and are typically joined by mechanical fasteners. However, in an increasing number of applications, it is desired to join aluminum parts by welding.

Many space systems are welded, particularly tankage for fuel and oxidizer storage on launch systems. For example, two major systems that require extensive welding are the Titan family of missiles and the External Tank of the Space Shuttle. The Titan family currently uses Aluminum Association (AA) registered alloy 2014, comprising A1, Cu and Mg, as its main structural alloy, which is welded primarily with Al—Si filler alloy AA 4043. The Space Shuttle External Tank, which is essentially huge cryogenic tankage for liquid hydrogen and liquid oxygen, is mostly made of Al—Cu alloy AA 2219 welded with Al—Cu filler alloy AA 2319. In each of these systems, the desirability of saving weight may lead to the use of low density, high strength Al—Li alloys to replace conventional AA alloys 2014 and 2219. Since the conventional alloys, and potentially their Al—Li replacements, are joined by welding, a need exists for a weld filler alloy that can be easily fabricated and welded, and which possesses satisfactory mechanical, physical and corrosion resistance properties in the weldment.

A number of aluminum alloys have been found to have acceptable weldability. Several of these aluminum alloy compositions are based on aluminum-copper systems, wherein significant strengthening is induced by the precipitation of $CuAl_2$. One such aluminum-copper alloy that is widely used as a weld filler is AA alloy 2319 comprising, in weight percent, Al—(5.8–6.8)Cu—(0.2–0.4)Mn—(0.05–0.15)V—(0.1–0.25)Zr—(0.1–0.2)Ti.

Several recent studies have been performed on the weldability of aluminum-lithium alloys. These include: J. R. Pickens, "The Weldability of Lithium-Containing Aluminum Alloys", Journal of Material Science, Volume 20 (1985); J. R. Pickens, "Recent Developments in the Weldability of Lithium-Containing Aluminum Alloys", Journal of Material Science, Volume 25 (1990); J. C. Lippold, "Weldability of Commercial Aluminum-Lithium Alloys" Proceedings of the Aluminum-Lithium V Conference (1989); and T. S. Srivatsan and T. S. Sudarshan, "Welding of Light Weight Aluminum-Lithium Alloys", Welding Research Supplement (July 1991).

Among aluminum-lithium alloys developed prior to about 1985, the only generally accepted weldable aluminum-lithium alloy is the Soviet alloy 1420 comprising aluminum with 5.0 weight percent Mg and 2.2 weight percent Li. This alloy is reported to have medium to high strength, low density and a modulus of elasticity higher than standard aluminum alloys.

A few aluminum-copper-lithium base alloys, which are typically provided in wrought product form, have been commercialized. These include Aluminum Association registered alloys 2020, 2090, 2091, 2094, 2095, 2096, 2195 and 8090. Although some of these alloys have conventionally been joined by mechanical fasteners for aerospace applications, an increasing need exists for a weld filler alloy that is capable of joining such commercial alloys by welding.

Alloy 2020 has a nominal composition, in weight percent, of Al—4.5Cu—1.1Li—0.5Mn—0.2Cd, and was registered in the 1950's. Although alloy 2020 possessed a relatively low density and developed high strength, it also possessed relatively low levels of fracture toughness and ductility. These problems along with processing difficulties lead to the withdrawal of the alloy from the Aluminum Association register.

Alloy 2090 comprising Al—(2.4–3.0)Cu—(1.9–2.6)Li—(0–0.25)Mg—0.12Zr was designed as a low density replacement for high strength alloys such as 2024 and 7075. Although this alloy has relatively high strength, it also possesses poor short transverse fracture toughness and poor short transverse ductility associated with delamination problems and has not yet experienced widespread commercial useage.

Alloy 2091 comprising Al—(1.8–2.5)Cu—(1.7–2.3)Li—(1.1–1.9)Mg—0.12Zr was designed as a high strength, high ductility alloy. However, at heat treated conditions that produce maximum strength, ductility is relatively low in the short transverse direction. Additionally, the strength achieved by alloy 2091 in non-cold-worked tempers is below the strength attained by the alloy in cold-worked tempers.

Alloy 8090 comprising Al—(2.2–2.7)Li—(1.0–1.6)Cu—(0.6–1.3)Mg—0.12Zr was designed for aircraft applications in which exfoliation corrosion resistance and damage tolerance were required. However, alloy 8090's limited strength capability and less than desired fracture toughness have slowed the alloy's acceptance for widespread aerospace and aircraft applications.

Alloy 2094 comprises Al—(4.4–5.2)Cu—(0.8–1.5)Li—(0.25–0.6)Mg—(0.25–0.6)Ag—0.25 max. Zn—0.1 max. Mn—(0.04–0.18)Zr, while alloy 2195 comprises Al—(3.9–4.6)Cu—(1.0–1.6)Li—(0.25–0.6)Mg—(0.25–0.6)Ag—0.2 max. Zn—0.1 max. Mn—(0.04–0.18)Zr. These alloys possess exceptional mechanical properties such as ultra-high strength, high modulus and high fracture toughness at high strength levels.

U.S. Pat. Nos. 5,032,359, 5,122,339, 5,211,910 and 5,259,897, and U.S. patent application Ser. No. 08/032,158 filed Mar. 12, 1993 and U.S. patent application Ser. No. 08/103,662, filed Aug. 10, 1993, disclose aluminum alloys having excellent properties, which contain copper, lithium, magnesium and other alloying additions.

Each of the above-noted U.S. patents and publications are incorporated by reference herein.

The present invention has been developed in view of the foregoing and provides an Al—Cu—Li alloy with highly improved fabrication and weldability characteristics, as well as favorable mechanical and physical properties.

SUMMARY OF THE INVENTION

An object of the present invention is to provide a novel weld filler alloy.

Another object of the present invention is to provide an Al—Cu—Li weld filler alloy that can be easily fabricated and which possesses superior weldability.

Another object of the present invention is to provide an Al—Cu—Li weld wire that may be used to weld various aluminum-base alloys.

Another object of the present invention is to provide a method for making an Al—Cu—Li weld wire.

Another object of the present invention is to provide a method for welding an aluminum alloy with an Al—Cu—Li weld filler alloy.

Another object of the present invention is to provide a method for forming a cryogenic container by welding together component parts of the container using an Al—Cu—Li weld filler alloy.

These and other objects of the present invention will become more readily apparent from the following description.

DETAILED DESCRIPTION OF THE PREFERRED EMBODIMENTS

Figure 1:
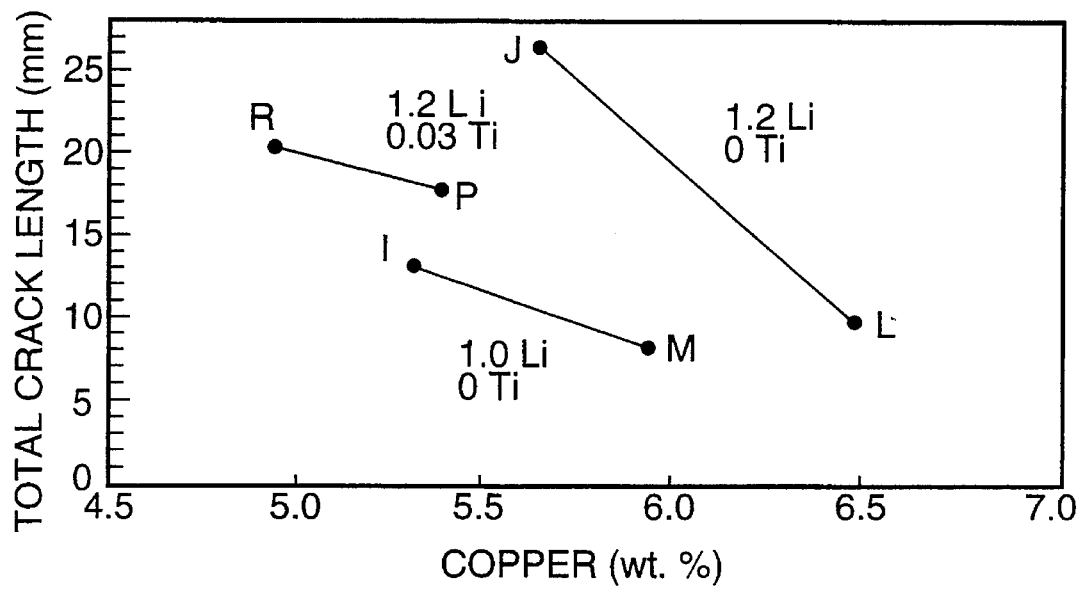
FIG. 1 is a graph of total crack length (TCL) vs. Cu content from varestraint testing of weldments in accordance with the present invention.

The present invention relates to an aluminum-base weld filler alloy comprising copper and lithium that can be easily fabricated, and which possesses superior weldability. In addition, weldments made with the filler alloy possess highly desirable mechanical, physical and corrosion resistance properties. The alloy of the present invention exhibits improved fabrication characteristics, allowing the alloy to be made into various product forms that are suitable for welding applications, such as weld wire. In accordance with the preferred embodiment, the alloy can be drawn into the form of weld wire without significant work hardening that is characteristic of conventional Mg-containing aluminum alloys.

The alloys of the present invention have been found to possess exceptional weldability. The term "weldability" is defined as an alloy's resistance to hot cracking during welding. The degree of hot cracking can be quantitatively measured by the varestraint test, which is a conventionally accepted method for determining a particular aluminum alloy's weldability.

In accordance with the present invention, weld filler alloys having compositions shown in Table 1 below are provided. Unless stated otherwise, all composition values herein are in weight percent.

TABLE 1

| Compositional Ranges of Alloys (Weight %) | | | | |
|---|---|---|---|---|
| | Cu | Li | Ag | Al |
| Broad | 3–7 | 0.4–1.8 | 0–0.8 | balance |
| Preferred | 3.5–5.5 | 0.6–1.2 | 0.2–0.6 | balance |
| More Preferred | 4–5.2 | 0.8–1.1 | 0.3–0.5 | balance |
| Most Preferred | 4.5 | 1.0 | 0.4 | balance |

Other alloying additions such as Zr, Ti, Cr, Mn, Hf, Nb, B, Fe, Y, La, V, Mo, Se, Co, Ni, In, Sn, Ge, Sc, Zn, Be and combinations thereof may be included in amounts up to a total of about 10 weight percent as long as such additions do not significantly impair the fabricability, weldability, mechanical properties and physical properties of the present alloys. Grain refiners such as Zr, Ti, B, V, Hf, Nb, Mn, Cr, Sc, $TiB_2$ and combinations thereof may be included in a preferred total amount of from about 0.01 to about 1.0 weight percent, and more preferably from about 0.08 to about 0.3 weight percent. Grain refining additions of up to 0.2 weight percent Zr and up to 0.3 weight percent Ti, and more preferably up to 0.15 weight percent Zr and up to 0.2 weight percent Ti, are particularly suitable. Nucleation aids such as Zn, In, Ge, Sc and combinations thereof may also be added to the present alloys in a preferred total amount of up to 1.0 weight percent. Other elements for oxygen gettering such as Be may also be added to the present alloys in a preferred amount of up to 0.1 weight percent. Incidental impurities associated with aluminum such as Si and Fe may also be present in the alloys, but it is generally desirable to minimize such impurities.

The use of copper within the above-identified ranges results in substantially improved weldability, particularly for alloys with the preferred level of at least about 3.5 weight percent Cu. Susceptibility to hot cracking is especially low for alloys having the more preferred level of at least about 4.0 weight percent Cu. The use of copper within the above-identified ranges also produces significantly increased tensile and yield strengths. However, too much Cu can decrease the ductility of the weldment. Thus, the amount of Cu should typically be kept below 7 weight percent, depending on the Cu content of the base alloy to be welded.

The use of lithium within the above-noted ranges has been found to substantially increase strength and improve elastic modulus. Furthermore, the use of Li decreases density, which is important for space launch vehicle applications. The presence of Li in the present alloys in amounts of from about 0.4 to about 1.8 weight percent, and more preferably from about 0.6 to about 1.2 weight percent, results in substantially improved tensile properties while significantly decreasing density and increasing weldment stiffness. At the more preferred range of from about 0.8 to about 1.1 weight percent Li, and particularly at the most preferred level of 1.0 weight percent Li, resistance to hot cracking is substantially improved while maintaining highly favorable strength levels.

In a preferred embodiment, silver is used to promote weldability of the filler alloys. In addition, the use of silver increases fluidity in the weld pool, which improves the ease with which weldments can be made during various welding operations. It has been found that the use of Ag in amounts above about 0.1 weight percent and preferably above about 0.2 weight percent results in a substantial decrease in susceptibility to hot cracking.

The weld filler alloys of the present invention are free of Mg. It has been found that small amounts of Mg significantly decrease the fabricability of the present weld filler alloys. Furthermore, the presence of Mg substantially reduces weldability, resulting in a significant increase in hot cracking. Magnesium is therefore not purposefully added to the present weld filler alloys and its presence as an impurity should be minimized. Magnesium levels should not exceed 0.1 weight percent, and preferably should not exceed 0.05 weight percent. Most preferably, Mg should not exceed 0.01 weight percent in order to significantly improve fabricability and weldability of the present filler alloys.

Other additions such as Cd, which is recognized as a toxic substance, should not be included in the present alloys. Cadmium should be particularly avoided because its vapor can present a health hazard to welders.

In accordance with the present invention, alloys were prepared having compositions as set forth in Table 2. The weld filler alloys that do not contain Mg are considered to be within the scope of the present invention, while the Mg-containing alloys are provided for comparison purposes.

TABLE 2

| Compositional Ranges of Alloys (Weight %) | | | | | | |
|---|---|---|---|---|---|---|
| Alloy | Cu | Li | Ag | Mg | Zr | Ti | Al |
| A | 6.7 | 1.3 | 0.4 | 0 | 0.16 | 0 | balance |
| B | 6.2 | 1.3 | 0.4 | 0.2 | 0.14 | 0 | balance |
| C | 6.2 | 1.3 | 0.4 | 0.4 | 0.14 | 0 | balance |
| D | 5.2 | 0.5 | 0 | 0 | 0 | 0 | balance |
| E | 5.1 | 1.0 | 0 | 0 | 0 | 0 | balance |
| F | 5.0 | 1.4 | 0 | 0 | 0 | 0 | balance |
| G | 5.0 | 1.0 | 0.4 | 0 | 0.15 | 0 | balance |
| H | 5.2 | 1.25 | 0.4 | 0.4 | 0.15 | 0.1 | balance |
| I | 5.3 | 1.0 | 0.4 | 0.4 | 0.14 | 0 | balance |
| J | 5.6 | 1.2 | 0.4 | 0.4 | 0.16 | 0 | balance |
| K | 5.9 | 1.9 | 0.4 | 0.5 | 0.17 | 0 | balance |
| L | 6.5 | 1.2 | 0.4 | 0.4 | 0.15 | 0 | balance |
| M | 5.9 | 0.9 | 0.4 | 0.4 | 0.15 | 0 | balance |
| N | 6.8 | 0 | 0.4 | 0.4 | 0.14 | 0 | balance |
| O | 5.2 | 1.2 | 0.4 | 0.5 | 0.12 | 0.10 | balance |
| P | 5.4 | 1.1 | 0.4 | 0.3 | 0.09 | 0.03 | balance |
| Q | 5.4 | 1.3 | 0 | 0.4 | 0.14 | 0.03 | balance |
| R | 4.9 | 1.2 | 0.4 | 0.4 | 0.07 | 0.03 | balance |
| S | 5.5 | 1.4 | 0 | 0.2 | 0.14 | 0 | balance |
| T | 5.1 | 1.3 | 0 | 0.6 | 0.15 | 0 | balance |
| U | 5.3 | 1.2 | 0 | 0.8 | 0.14 | 0 | balance |
| V | 6.2 | 1.3 | 0.6 | 0.4 | 0.14 | 0 | balance |
| W | 6.4 | 1.3 | 0 | 0 | 0.14 | 0 | balance |
| X | 4.9 | 1.0 | 0.39 | 0 | 0.19 | 0 | balance |
| Y | 5.3 | 1.0 | 0.42 | 0 | 0.19 | 0 | balance |
| Z | 4.9 | 1.0 | 0.39 | 0 | 0 | 0.16 | balance |
| AA | 5.1 | 0.9 | 0.40 | 0 | 0.15 | 0.16 | balance |

TABLE 2-continued

| Compositional Ranges of Alloys (Weight %) | | | | | | |
|---|---|---|---|---|---|---|
| Alloy | Cu | Li | Ag | Mg | Zr | Ti | Al |
| BB | 4.8 | 1.1 | 0.39 | 0 | 0 | 0.05 | balance |
| CC | 4.8 | 1.0 | 0.39 | 0 | 0 | 0.10 | balance |
| DD | 4.9 | 1.1 | 0.42 | 0.38 | 0.12 | 0.09 | balance |

Unless otherwise indicated, each of the above-listed compositions was prepared as follows. The alloys were cast as 50 pound (23 kg), 6.5 inch (16.5 cm) diameter ingots using an inert gas induction melting furnace. The ingots were homogenized at 450° C. for 16 hours plus 504° C. for 8 hours, scalped and extruded into 1.5 inch$^2$ cross-section rectangular bars at a preheat temperature of 375° C. The extrusions were solution heat treated for 1 hour at a temperature just below the solidus, water quenched and stretched 3 percent.

While the alloys of the present invention are preferably cast into ingot form, the alloys may also be provided in the form of ingot consolidated from fine powders or particulates. The powder or particulate material may be produced by such processes as atomization, mechanical alloying, melt spinning, splat cooling, plasma deposition and the like. The use of such powder metallurgy techniques allows for the incorporation of increased levels of grain refining and/or dispersoid forming elements in amounts in excess of 1.0 weight percent.

To provide a preliminary indication of weldability, some of the above-noted alloys were provided in the form of cut rod welding filler having a square cross-section of 0.125× 0.125 inch. The cut rod is produced by cutting strips from the extruded bar of each of the alloys, followed by milling to yield a smooth surface. These cut rod samples were then used in welding operations as described more fully below.

The weld filler alloys of the present invention are most preferably provided in the form of drawn wire. The wire may be produced, for example, by extruding the alloy through a multiple hole die to a diameter of 0.375 inch at a temperature of 690° F. and a ram speed of 0.03 inch per second. The 0.375 inch extruded rod may then be drawn into wire using multiple drawing steps. Extrusion ratios typically used to draw aluminum wire may be employed. A reduction in cross-sectional area of less than about 2 times is particularly preferred. Thus, for example, the 0.375 inch rod may be drawn in subsequent steps to 0.0625 inch diameter, with an anneal at 800° F. between each step. The 0.0625 inch wire can also be drawn to smaller diameters if desired, i.e., 0.05 and 0.035 inch.

The following examples illustrate various aspects of the present invention and are not intended to limit the scope of the invention.

EXAMPLE 1

Weld filler alloys having the compositions A, B and C in Table 2 were provided in the form of cut rod filler, having a cross-section of 0.125×0.125 inch. The filler alloys A, B and C are of similar composition, with the exception that alloy A contains no Mg, alloy B contains 0.2 weight percent Mg and alloy C contains 0.4 weight percent Mg. The filler alloys were used to weld a base alloy having a composition of Al—6.2Cu—1.3Li—0.4Ag—0.4Mg— 0.14Zr, similar to alloy C. In each case, the base alloy was provided in the solution heat treated, cold worked and naturally aged T3 condition. Welding was performed using a gas tungsten arc (GTA) welding process in which the weld filler was hand-fed into the welding zone. Each of the resulting weldments was allowed to naturally age for ten days, at which time mechanical testing of the yield strength (YS), ultimate tensile strength (UTS) and elongation (el.) of each weldment was performed. The results are shown below in Table 3. It can be seen that the elimination of Mg from the weld filler alloy does not lower the mechanical properties of the weldment.

TABLE 3

Tensile Properties of GTA Weldments

| Filler Alloy | Composition | YS (ksi) | UTS (ksi) | el. (%-1") |
|---|---|---|---|---|
| A | Al-6.2Cu-1.3Li-0.4Ag-0Mg-0.14Zr | 31.0 | 41.7 | 3.6 |
|   |   | 30.3 | 44.6 | 5.1 |
| B | Al-6.2Cu-1.3Li-0.4Ag-0.2Mg-0.14Zr | 30.8 | 42.8 | 3.9 |
|   |   | 32.1 | 47.0 | 5.3 |
| C | Al-6.2Cu-1.3Li-0.4Ag-0.4Mg-0.14Zr | 28.9 | 42.5 | 5.2 |
|   |   | 31.5 | 43.4 | 5.1 |

EXAMPLE 2

This example demonstrates the effect of varying amounts of Li on strength and ductility properties of the present weld filler alloys. Weld filler alloys having the compositions D, E and F in Table 2 were drawn into weld wire having a diameter of 0.0625 inch by the following process. A bar of each alloy was extruded to a diameter of 0.265 inch and then drawn to 0.216 inch and to 0.187 inch diameters with a 1 hour anneal at 800° F. before each drawing step. The wire was then drawn to 0.0625 inch diameter in six passes with an anneal at 800° F. between alternating passes. Each filler alloy was used to weld a base alloy having a composition of Al—4.7Cu—1.1Li—0.4Ag—0.4Mg—0.14Zr—0.02Ti in the T8 temper. Welding was performed in two passes using a variable polarity gas tungsten arc (VP-GTA) welding process. The 0.375 inch welded panels were machined to form 0.25 inch diameter round tensile specimens. Tensile tests were performed on the specimens at both ambient temperature (20° C.) and cryogenic liquid nitrogen temperature (−196° C.). The results of the tensile tests, including the reduction in area of the tensile specimens (RA), are shown below in Table 4. These results indicate that the weldments made using filler alloy E provide the best combination of strength and ductility, making 1.0 weight percent Li the most preferred level in the present filler alloys for optimal tensile properties.

TABLE 4

Tensile Properties of VP-GTA Weldments At Ambient and Cryogenic Temperatures

| Filler Alloy | Temp (°C.) | Comp. | YS (ksi) | UTS (ksi) | el. (%-1") | RA (%) |
|---|---|---|---|---|---|---|
| D | 20 | Al-5.2Cu-0.5Li-0Mg | 33.8 | 48.6 | 3.3 | 7.5 |
|   | −196 |   | 43.8 | 55.7 | 1.8 | 4.5 |
| E | 20 | Al-5.1Cu-1.0Li-0Mg | 34.7 | 49.9 | 3.7 | 10.5 |
|   | −196 |   | 44.3 | 58.7 | 2.6 | 5.4 |
| F | 20 | Al-5.0Cu-1.5Li-0Mg | 34.5 | 50.8 | 4.4 | 10.0 |
|   | −196 |   | 44.9 | 57.4 | 2.0 | 2.0 |

EXAMPLE 3

Weld filler alloys having the compositions G and H in Table 2 were drawn into weld wire having a diameter of 0.0625 inch. The filler alloys are of similar composition with the exception that alloy G contains no Mg while alloy H contains 0.4 weight percent Mg. A bar of alloy G was extruded to a diameter of 0.265 inch and then drawn in multiple passes to 0.216 inch (1.5×), 0.187 inch (1.3×), 0.162 inch (1.3×), 0.140 inch (1.3 ×), 0.121 inch (1.3×), 0.092 inch (1.7×), 0.078 inch (1.3×) and 0.0625 inch (1.5×), with the numbers in parentheses indicating the reduction in cross-sectional area for each pass. A 1 hour anneal at 800° F. is used before each drawing step. The wire was etched and waxed occasionally to maintain good surface finish. Magnesium-free alloy G was easily drawn down into wire using the multiple drawing passes. Under identical drawing conditions, the magnesium-containing alloy H broke during drawing, with the broken rods exhibiting extensive chevron-type cracks. In order to perform welding studies, the alloy H filler rods had to be cut into relatively short lengths, annealed before drawing, and then butt-welded back together. Drawing of the alloy H filler alloy therefore required repeated starting and stopping of the drawing operation, which resulted in excessive delays. Each of the alloy G and alloy H fillers was used to weld an Al—Cu—Li—Mg—Ag base alloy. In addition, AA alloy 2319, comprising Al—6.3Cu—0.3Mn—0.15Ti—0.10V—0.18Zr, was used to weld a similar base alloy for comparison purposes. The composition of each weld filler alloy and each base alloy are shown below in Table 5.

TABLE 5

Weld Filler Alloy and Base Alloy Compositions

| Filler Alloy | Filler Alloy Comp. | Base Alloy Comp. |
|---|---|---|
| G | Al-5.0Cu-1.0Li-0.4Ag-0Mg-0.15Zr | Al-5.1Cu-1.3Li-0.38Ag-0.34Mg-0.12Zr-0.04Ti |
| H | Al-5.2Cu-1.25Li-0.4Ag-0.4Mg-0.15Zr-0.1Ti | Al-5.0Cu-1.3Li-0.37Ag-0.32Mg-0.12Zr-0.04Ti |
| 2319 | Al-6.3Cu-0.3Mn-0.15Ti-0.10V-0.18Zr | Al-4.8Cu-1.2Li-0.36Ag-0.3Mg-0.13Zr-0.04Ti |

Welding of the above filler alloy and base alloy compositions was performed using a VP-GTA welding process. Plates of the base alloy were horizontally VP-GTA welded with a square butt and no gap. One side of the plates was welded with about 60 percent penetration. The plates were then flipped and the process was repeated. The welding parameters were 235 Amp, 12.5 Volt, 20 inch/min. wire speed, 11 inch/min. travel speed, 10 msec. straight polarity, 1 msec. reverse polarity and 70 cfh He, using a tungsten electrode containing 2 percent Ce. Chemical analysis was performed on the resulting weldments, which comprise a combination of the weld filler alloy and base alloy. The results of the chemical analysis are shown below in Table 6. Although not shown in Table 6, the balance of each weldment is aluminum.

TABLE 6

Weldment Compositions (Filler Plus Base)

| Filler Alloy | Cu | Li | Ag | Mg | Zr | Ti | Other |
|---|---|---|---|---|---|---|---|
| G | 4.64 | 1.27 | 0.38 | 0.29 | 0.12 | 0.04 | — |
| H | 4.85 | 1.20 | 0.37 | 0.30 | 0.12 | 0.04 | — |
| 2319 | 4.84 | 1.21 | 0.36 | 0.30 | 0.12 | 0.04 | 0.02 Mn |

It is noted that although alloy G contains no Mg and alloy H contains 0.4 weight percent Mg, the resulting weldment compositions are very similar due to the similarities of the base metal compositions. Since significant amounts of the base metal melts during the welding operation and enters the weld pool, the final composition of the weldment depends largely on the starting base metal composition. It has been found in accordance with the present invention that Mg-free weld filler alloys can be fabricated into weld wire much more easily than similar Mg-containing filler alloys and, when used to weld Al—Cu—Li alloys containing Mg, produce weldments of similar composition to weldments formed using Mg-containing filler alloys that are hard to fabricate.

EXAMPLE 4

Weld filler wires formed from alloy G, alloy H and alloy AA 2319 as in Example 3 were used to weld a base alloy having a composition of Al—4.8Cu—1.3Li—0.4Ag—0.4Mg—0.14Zr in the solution heat treated, cold worked, artificially aged T8 condition. In each case, two 0.375×2×12 inch extruded bars of the base alloy were joined in a square butt configuration with no gap. The bars were clamped in a horizontal steel fixture with a copper back-up bar. A current of 260 Amp and a voltage of 19 Volt were used with a travel speed of 12 inch/min. and a wire speed of 100 inch/min. Each joint was made in a single pass. Tensile tests were performed at room temperature (20° C.) and in liquid nitrogen (−196° C.) on round tensile specimens having a diameter of 0.25 inch. The results are shown below in Table 7.

TABLE 7

Tensile Properties of GTA Weldments at Ambient and Cryogenic Temperatures

| Filler Alloy | Temp. (°C.) | YS (ksi) | UTS (ksi) | el. (%-1") | RA (%) |
|---|---|---|---|---|---|
| G | 20 | 32.7 | 51.4 | 6.9 | 14.1 |
| G | −196 | 42.0 | 63.6 | 6.1 | 7.6 |
| H | 20 | 33.7 | 45.0 | 2.1 | 3.9 |
| H | −196 | 43.4 | 57.4 | 2.6 | 3.6 |
| 2319 | 20 | 29.1 | 48.6 | 9.1 | 17.9 |
| 2319 | −196 | 37.4 | 60.2 | 4.7 | 6.5 |

As can be seen in Table 7, weldments made with the Mg-free filler alloy G have the best strength/ductility combinations at both ambient and cryogenic temperatures. It is noted that the weldment made using the conventional 2319 filler alloy, while having excellent room temperature ductility, shows a precipitous drop at −196° C. The weldments made using alloy G exhibit superior ductility at the cryogenic temperature compared with Mg-containing alloy H and conventional alloy 2319.

EXAMPLE 5

Weld filler wire was produced as in Example 3 from alloy G, alloy H and alloy AA 2319. The filler alloys were used to weld 0.375 inch thick extruded plate having a composition of Al—4.7Cu—1.3Li—0.4Ag—0.4Mg—0.14Zr in the T8 temper. These welds were made using a VP-GTA welding process. Various types of tensile specimens were made from the welded samples. Flat specimens were formed having a 0.375×0.25 inch gauge section; large specimens were formed having a 0.375×0.50 inch gauge section; and round specimens were formed having a diameter of 0.25 inch. Tensile properties were measured with both the weldment reinforcement (bead) left intact or machined off. In addition, tensile properties were measured at both ambient and cryogenic temperatures. The results are shown in Table 8 below.

TABLE 8

Tensile Properties of VP-GTA Weldments at Ambient and Cryogenic Temperatures

| Alloy | Specimen | Bead | Temp (°C.) | YS (ksi) | UTS (ksi) | el. (%-1") |
|---|---|---|---|---|---|---|
| G | flat | on | 20 | 35.2 | 49.0 | 4.9 |
| G | flat | on | 20 | 29.5 | 43.3 | 3.3 |
| G | flat | off | 20 | 30.7 | 46.5 | 5.3 |
| G | flat | off | 20 | 30.8 | 45.8 | 4.7 |
| G | large | on | 20 | 27.4 | 48.1 | 6.0 |
| G | large | on | 20 | 33.1 | 48.1 | 4.8 |
| G | round |  | 20 | 33.1 | 45.0 | 2.1 |
| G | round |  | 20 | 30.7 | 45.5 | 4.2 |
| G | round |  | −196 | 43.1 | 63.7 | 6.2 |
| G | round |  | −196 | 43.1 | 61.0 | 3.9 |
| H | flat | on | 20 | 33.6 | 49.2 | 5.7 |
| H | flat | on | 20 | 31.4 | 50.5 | 6.8 |
| H | flat | off | 20 | 30.6 | 45.1 | 4.6 |
| H | flat | off | 20 | 31.1 | 46.7 | 5.8 |
| H | large | on | 20 | 32.0 | 49.3 | 5.3 |
| H | large | on | 20 | 34.5 | 50.2 | 5.8 |
| H | round |  | 20 | 31.0 | 46.6 | 3.6 |
| H | round |  | 20 | 31.7 | 47.6 | 4.5 |
| H | round |  | −196 | 42.9 | 61.0 | 4.7 |
| H | round |  | −196 | 41.7 | 56.7 | 3.9 |
| 2319 | flat | on | 20 | 33.2 | 48.2 | 4.6 |
| 2319 | flat | on | 20 | 31.4 | 48.8 | 5.6 |
| 2319 | flat | off | 20 | 30.4 | 46.4 | 5.0 |
| 2319 | flat | off | 20 | 30.4 | 46.0 | 4.8 |
| 2319 | large | on | 20 | 32.4 | 44.0 | 3.5 |
| 2319 | large | on | 20 | 34.4 | 48.6 | 4.8 |
| 2319 | round |  | 20 | 32.3 | 47.9 | 4.5 |
| 2319 | round |  | 20 | 32.2 | 48.0 | 3.8 |
| 2319 | round |  | −196 | 41.8 | 62.4 | 3.3 |
| 2319 | round |  | −196 | 40.9 | 52.8 | 1.7 |

As shown in Table 8, the omission of Mg from the weld filler alloy does not substantially lower weldment strength, while at the same time providing substantially improved fabricability.

The weldability of aluminum alloys is conventionally defined as an alloy's resistance to hot cracking, a defect manifested at the trailing edge of the weld pool during solidification. Alloys with low melting temperature eutectics are particularly susceptible to this defect, generating liquid films at grain boundaries that extend well behind the weld pool. These liquid films are exposed to strains from both solidification shrinkage and thermal contraction that can tear them apart. Aluminum alloys in general, and Al—Cu—Mg alloys in particular, are known to be susceptible to various degrees of hot cracking.

The varestraint test is commonly used to evaluate the degree of hot cracking in aluminum alloys. This test involves bending a weld coupon over a curved mandrel during the welding process. Strain is applied in a direction that is parallel to the direction of welding at a high rate of loading. The amount of strain experienced by the semi-solid region behind the weld pool is predetermined by the radius of the mandrel. The trans-varestraint test is similar to the varestraint test except that strain is applied transverse to the welding direction.

The highly improved resistance to hot cracking of the Mg-free alloys of the present invention is illustrated in the following examples.

EXAMPLE 6

Alloys A, I, J, K, L, M, N, O, R, S, T, U and W in Table 2 were formed into varestraint test specimens as follows. Each of the alloys was cast into 50 pound, 6 inch diameter ingot, and then extruded into bars having a cross-section of 2×0.75 inch. Each bar was cut into longitudinal specimens having dimensions of 1×6.25× 0.25 inch. The specimens were loaded into a varestraint test fixture using a 0.5% strain mandrel. An autogenous GTA weld was made lengthwise along each alloy specimen while pulling the specimen around the curved mandrel during the welding operation. The resulting cracks were measured using a computerized image analysis system. The welding parameters were held constant for each test at 100 Amp, 15 Volt, 10 inch/min. travel speed and 30 cfh He, with direct current electrode negative (DCEN). The varestraint test results are shown in FIGS. 1, 3, 5 and 7, comparing total crack length (TCL) as a function of alloy content for variations in Cu, Li, Mg, Ag and Ti. FIGS. 2, 4, 6 and 8 show corresponding weld metal hardness values for the above-noted alloys, which are used to indicate relative strength. In FIGS. 1–8, the alloy designations from Table 2 are listed next to the corresponding data points. The composition values listed in the figures represent nominal compositions rather than actual measured compositions.

Figure 2:
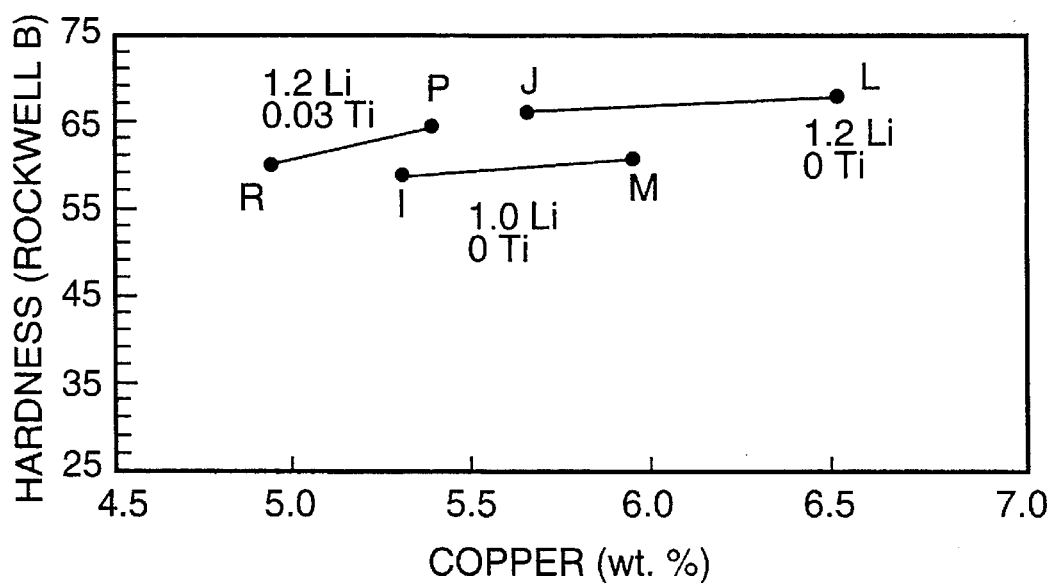
FIG. 2 is a graph of weldment hardness vs. Cu content in accordance with the present invention.

As shown in FIG. 1, increasing amounts of Cu reduce the susceptibility to hot cracking. Increasing amounts of Cu also result in a slight increase in weldment hardness and strength, as shown in FIG. 2.

Figure 3:
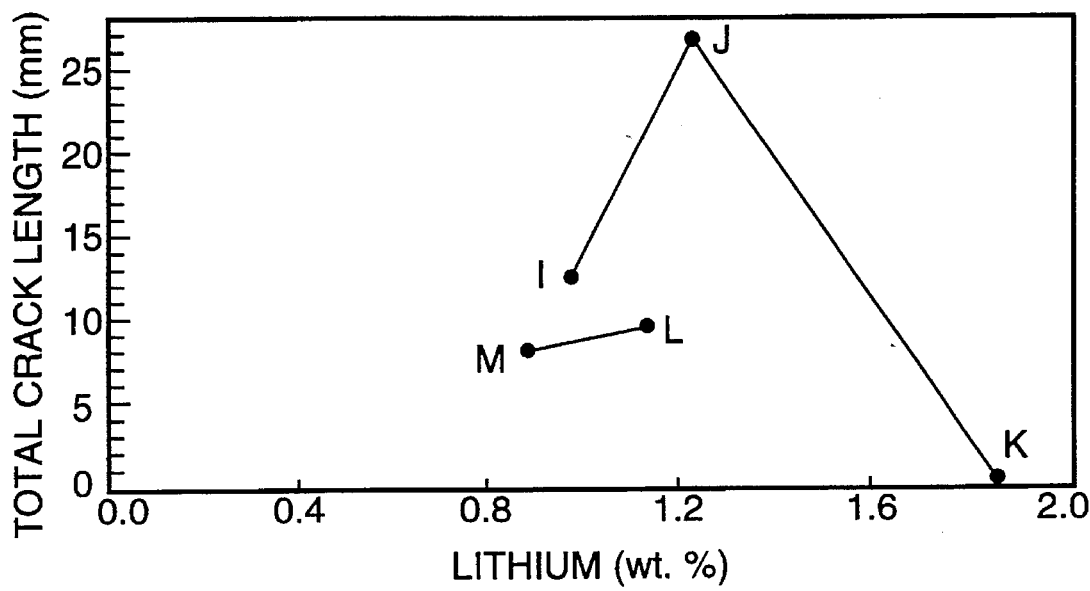
FIG. 3 is a graph of TCL vs. Li content for weldments in accordance with the present invention.
Figure 4:
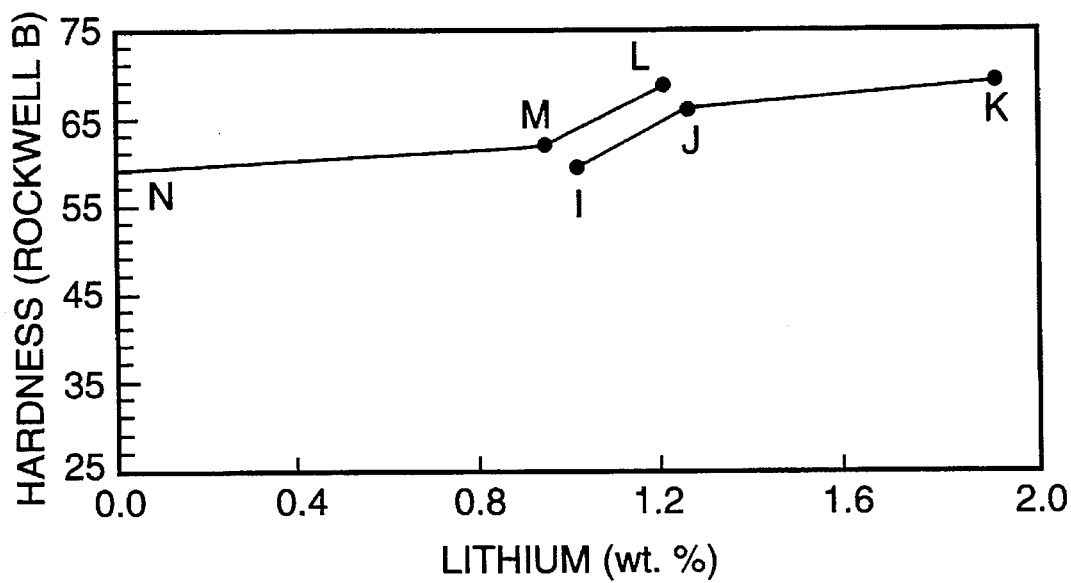
FIG. 4 is a graph of weldment hardness vs. Li content in accordance with the present invention.

As shown in FIG. 3, the effect of lithium on weldability reaches a peak susceptibility to cracking at about 1.2 weight percent, with significantly less susceptibility below and above this amount. Increasing amounts of Li from 0.8 to 2.0 weight percent also result in slightly increased hardness and strength, as shown in FIG. 4.

Figure 5:
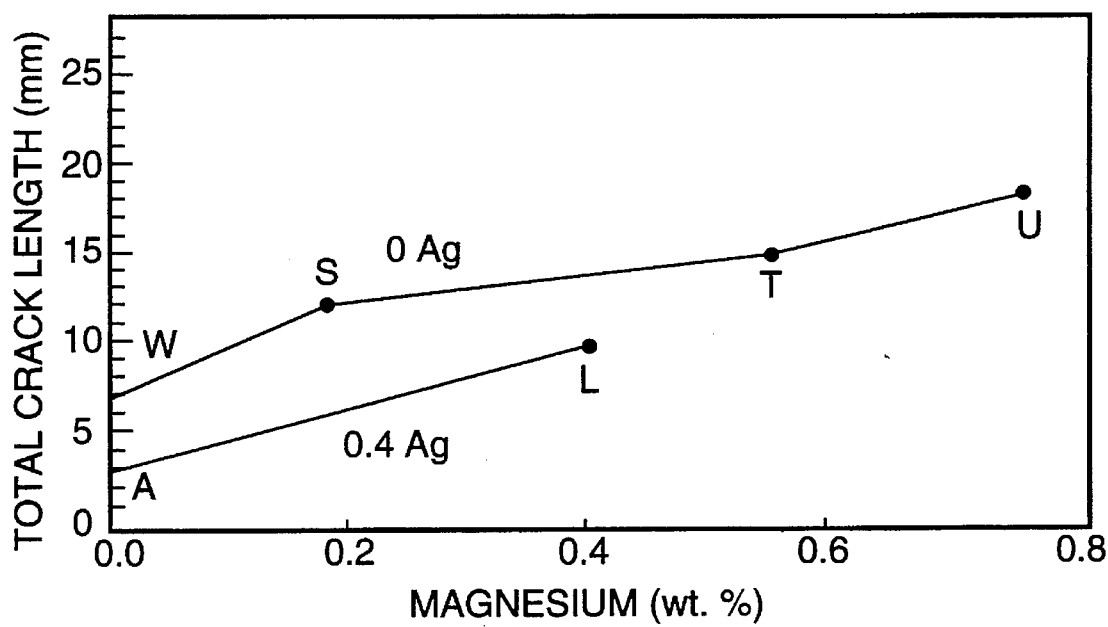
FIG. 5 is a graph of TCL vs. Mg content for weldments in accordance with the present invention.
Figure 6:
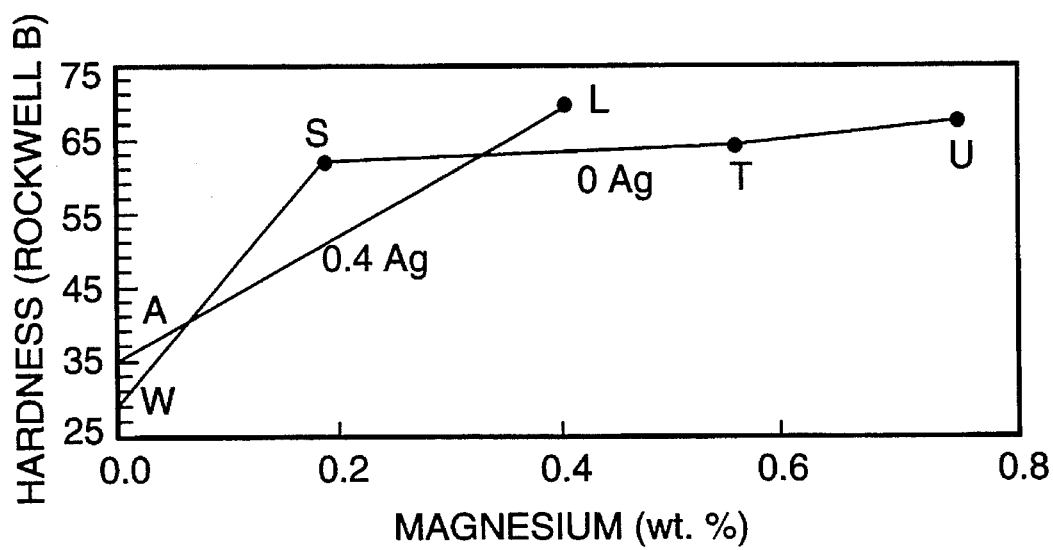
FIG. 6 is a graph of weldment hardness vs. Mg content in accordance with the present invention.

With particular reference to FIG. 5, the addition of magnesium has been found to significantly increase susceptibility to hot cracking, as indicated by the rapid increase in TCL with magnesium content. Also shown in FIG. 5 is the substantial decrease in TCL that is achieved with Ag-containing weld filler alloys in accordance with the preferred embodiment of the invention. FIG. 6 shows that Mg is a potent hardener while Ag has only a minor effect on hardening.

Figure 7:
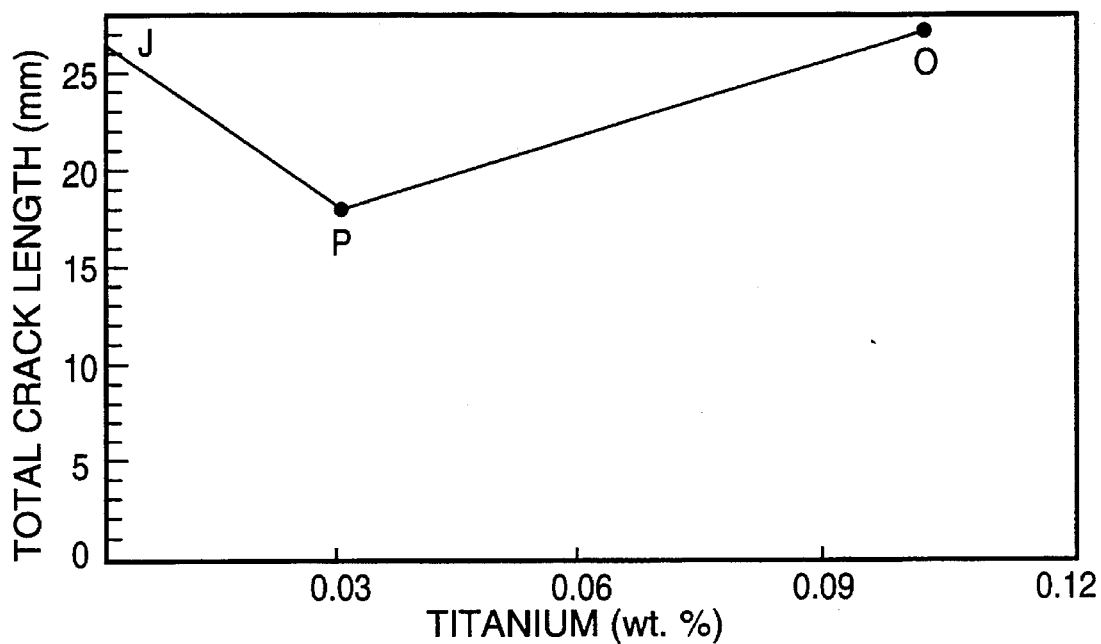
FIG. 7 is a graph of TCL vs. Ti content for weldments in accordance with the present invention.
Figure 8:
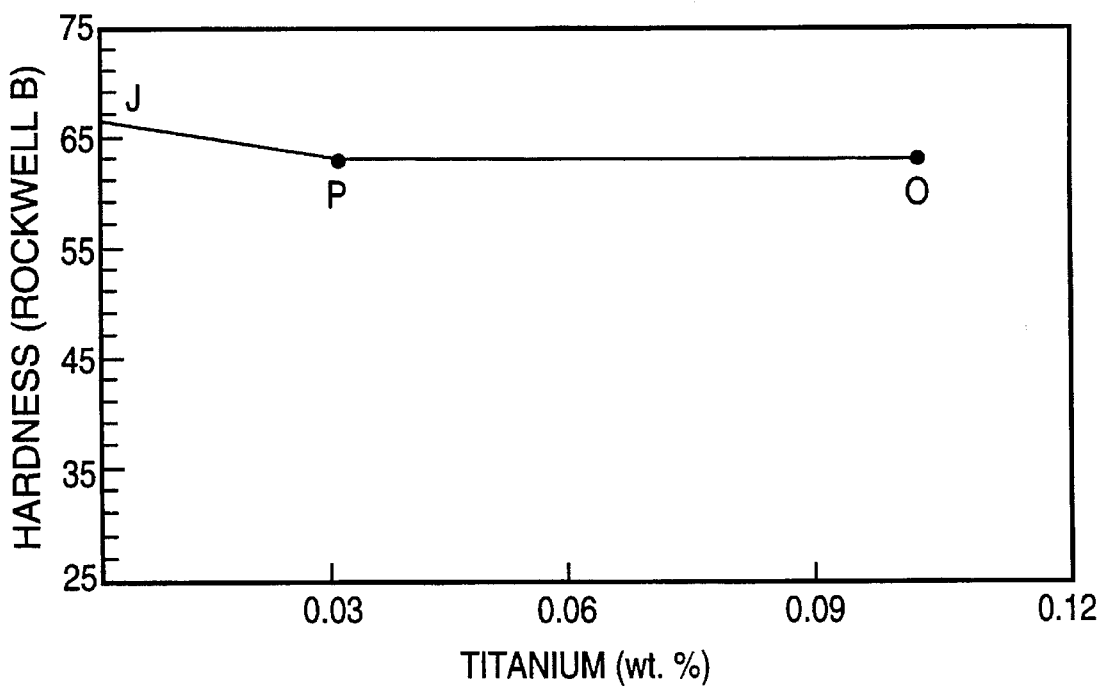
FIG. 8 is a graph of weldment hardness vs. Ti content in accordance with the present invention.

As shown in FIG. 7, the presence of about 0.03 Ti in the weld filler alloy results in decreased susceptibility to hot cracking, while having essentially no detected effect on hardness and strength characteristics. The higher levels of Ti are believed to increase TCL by causing undesirable twin columnar grain formation in the weldment.

The absence of Mg in the weld filler alloys of the present invention has been found to significantly increase fabricability and weldability of the alloys, while substantially maintaining or even improving tensile properties of the weldments. While not intending to be bound by any particular theory, the absence of Mg is believed to reduce work hardening during weld wire formation in comparison to Mg-containing filler alloys. The Mg-free alloys of the present invention, due to their minimal work hardening, are easily drawn into weld wire without the problems associated with Mg-containing alloys. The exclusion of Mg from the present alloys has been found to reduce hot shortness during extrusion of the weld wire from stock, resulting in highly improved surface finish of the resulting weld wire. It is also believed that the absence of Mg eliminates a lower melting point eutectic that detrimentally extends the freezing range of the alloy during welding solidification. The presence of such a detrimental eutectic associated with the presence of Mg can also cause hot shortness during fabrication of the weld wire. Accordingly, the Mg-free alloys of the present invention have unexpectedly been found to significantly increase the fabricability of weld wire and other weld filler product forms. Moreover, the absence of Mg has unexpectedly been found to substantially improve weldability by decreasing the susceptibility to hot cracking in the present alloys while providing superior strength/ductility combinations in weldments.

A novel feature of the present invention is the discovery that Mg-free weld filler alloys, which are more easily fabricated and possess improved weldability, can be used to form weldments having substantially the same or improved tensile properties as weldments formed from similar weld filler alloys that contain Mg. The present Mg-free filler alloys can be used to weld Mg-containing base alloys, such as 2XXX series alloys and Al—Cu—Li—Mg alloys, wherein the resultant weldment contains beneficial amounts of Mg due to melting of the base metal during the welding operation. Therefore, the present filler alloys can be used to form weldments having highly desirable tensile properties, while at the same time permitting substantially improved fabrication and weldability characteristics.

Suitable base alloys that can be welded with the weld filler alloys of the present invention include 2XXX series alloys, Al—Cu alloys, Al—Cu—Li alloys, Al—Cu—Mg alloys and Al—Cu—Li—Mg alloys. Such base alloys may additionally contain Ag and/or Zn. Particularly preferred base alloys are those disclosed in U.S. Pat. Nos. 5,032,359, 5,122,339, 5,211,910 and 5,259,897, as well as U.S. patent application Ser. Nos. 08/032,158 and 08/103,662 cited previously. These aluminum alloys contain Cu, Li, Mg and other alloying additions such as Ag and Zn. In these preferred base alloys, Mg has been shown to be a very potent nucleation aid that substantially improves strength in Al—Cu—Li alloys. Furthermore, the addition of Ag and Mg to such Al—Cu—Li alloys is even more effective than Mg alone. When welding such base alloys with the weld filler alloys of the present invention, sufficient Mg from the base metal goes into the fusion zone to serve as a nucleation aid and to increase weldment strength.

When the present weld filler alloys are used to weld base alloys, the resulting weldment, which comprises a combination of both the filler and base alloys, preferably contains Mg. A Mg-containing base aluminum alloy can thus be welded with the present filler alloy in order to produce a Mg-containing weldment of superior strength. For example, in a welding operation in which the resultant weldment comprises 80 percent of the base alloy and 20 percent of the filler alloy, the amount of Mg present in the weldment will be only slightly less than that of the base alloy. Similarly, the amounts of other alloying additions present in the base alloy such as Cu, Li and the like may have a strong effect on the composition of the resulting weldment.

In accordance with the present invention, weldments made on aluminum alloys with the present weld filler alloy, preferably have a resulting composition comprising from about 3 to about 7 weight percent Cu, from about 0.2 to about 2.2 weight percent Li, from about 0.2 to about 2.0 weight percent Mg, and the balance Al and incidental impurities. More preferably, the resulting weldment has a composition comprising from about 3.5 to about 5.5 weight percent Cu, from about 0.6 to about 1.2 weight percent Li and from about 0.2 to about 0.8 weight percent Mg. Such weldments may optionally include Ag in a preferred amount of up to about 0.8 weight percent, more preferably from about 0.2 to about 0.6 weight percent. Furthermore, the weldments may include other additions such as grain refiners and nucleation aids.

The weld filler alloys of the present invention have been found to possess highly desirable corrosion resistance properties, as illustrated in the following example.

EXAMPLE 7

Weldments were made as in Example 5 using alloy G, alloy H and alloy AA 2319 filler wire to weld 0.375 inch thick extruded plate having a composition of Al—4.7Cu—1.3Li—0.4Ag—0.4Mg—0.14Zr in the T8 temper. Tensile specimens were made from the VP-GTA welded samples. The weldment specimens were tested for stress corrosion cracking (SCC) in a constant-load apparatus at 75 percent of the measured yield strength. The test was run for 42 days, alternately immersing the samples in a 3.5 percent NaCl aqueous solution with 10 minutes in the solution and 50 minutes out of the solution. The results are shown below in Table 9. Both the Mg-free alloy G and Mg-containing alloy H passed the 42 day stress corrosion test, while the conventional 2319 filler alloy weldments exhibited some failures. The improved stress corrosion cracking resistance of the weldments made with alloy G and alloy H filler is attributable to the better matching of the filler and base alloy compositions.

TABLE 9

Stress Corrosion Cracking
Test Results for VP-GTA Weldments

| Filler Alloy | Bead | Time to Failure |
| --- | --- | --- |
| G | on | pass |
| G | on | pass |
| G | off | pass |
| G | off | pass |
| H | on | pass |
| H | on | pass |
| H | off | pass |
| H | off | pass |
| 2319 | on | 25.1 days |
| 2319 | on | pass |
| 2319 | off | 22.9 days |

In accordance with a preferred embodiment, the weld filler alloy of the present invention may be used to weld cryogenic containers for space use and other applications. The component parts of such cryogenic containers may comprise 2XXX series alloys, Al—Cu alloys, Al—Cu—Mg alloys, Al—Li alloys, Al—Cu—Li alloys, Al—Cu—Li—Mg alloys, and the like. Preferably, the components of the cryogenic container comprise an alloy having a composition as disclosed in U.S. patent application Ser. No. 08/103,662, filed Aug. 10, 1993, of which this application is a continuation-in-part. The alloys of the application Ser. No. 08/103,662 comprise specific amounts of aluminum, copper and lithium, and are processed in such a manner, that produces improved fracture toughness at cryogenic temperatures in comparison to room temperature, making such alloys highly desirable for launch systems that use cryogenic tankage. When the alloys of the application Ser. No. 8/103,662 are welded with the filler alloys of the present invention, the resultant weldments possess a desirable cryogenic toughness trend wherein strength and toughness are higher at cryogenic temperatures than at room temperature, as illustrated in the following example.

EXAMPLE 8

An alloy of composition Al—4.9Cu—1.23Li—0.38Ag—0.46Mg—0.17Zr—0.04Ti was welded by GTA welding using filler wire of composition Al—5.20Cu—1.00Li—0.40Ag—0.16Zr. Plane strain fracture toughness was measured from compact tension specimens orientated with crack propagation parallel and through the fusion zone, or parallel and through the heat affected zone (HAZ). These specimens are orientated in a T-L orientation. In addition, long transverse tensile testing was performed on specimens including both the fusion zone and the HAZ. Tests were performed at 25° C. and −196° C. Weldment strength increased from 32.7 ksi YS, 51.4 ksi UTS with 6.9 percent elongation at 25° C. to 42.0ksi YS, 63.6 ksi UTS, and 6.1 percent elongation at −196° C. In addition, fusion zone toughness was 19.0 ksi$\sqrt{}$in at 25° C. increasing to 22.9 ksi$\sqrt{}$in at −196° C. Moreover, HAZ toughness increased from 18.8 ksi$\sqrt{}$in at 25° C. to 23.6 ksi$\sqrt{}$in at − 196° C. Thus, the desirable cryogenic toughness trend was attained on weldments using a filler alloy of the present invention.

The base alloys to be used in the fabrication of a cryogenic container may be rolled, extruded and/or forged to the product forms necessary to fabricate a container for holding cryogenic materials. Such a cryogenic tank, when used for holding cryogenic liquid such as liquid hydrogen, oxygen or nitrogen, generally consists of the barrel, which is a hollow cylinder, the domes, which are approximately hemispherical in shape, and the rings, which connect the barrel to the fore and aft domes. The barrel may be fabricated from plate that has been machined so that it has longitudinal T-shaped or L-shaped stiffeners. Alternatively, the barrel may be fabricated from integrally-stiffened extrusions which have the T-shaped or L-shaped longitudinal stiffeners introduced during the extrusion event. Furthermore, simple stiffeners may be rolled into the plate, e.g., linear stiffeners. In addition, the plate can be stiffened by isogrids. The rings can be foiled from extrusions that are bent over a curved tool and welded into a ring, or roll-ring forged, an operation in which a billet is pierced to a doughnut shape and the wall thickness is worked to thinner gages as the diameter increases. The domes may be formed from gore panels of plate or sheet that are stretched over a tool and welded together. Alternatively, the dome can be spin-formed from plate at cold, warm or hot working temperatures.

In each of these components of the cryogenic tank, stretch can be introduced during the forming operation after solution heat treatment and quench. In accordance with the disclosure of the application Ser. No. 08/103,662, such stretch is used to produce a desirable cryogenic toughness trend wherein toughness of the alloy actually increases at cryogenic temperatures. When stretching the components, the plate and extrusions can be simply stretch straightened. Alternatively, cold work can be introduced when the gore panels are stretched over a mandrel, the barrel panels are bump formed over a tool, the ring extrusions are bent and stretched over a tool to introduce curvature or the dome is spun formed. Artificial aging techniques may also be used to achieve the desirable cryogenic toughness trend.

The tank components may be welded together using the alloys of the present invention by any suitable conventional welding technique including gas tungsten arc welding, dual torch tungsten arc welding, metal inert gas welding, variable polarity plasma arc welding, variable polarity gas tungsten arc welding, electron beam welding and others.

In a preferred method for fabricating the cryogenic tank or container, the barrel panels are welded together with the present weld filler alloy to form a right circular cylinder which is then welded to the rings using the present filler alloy. The two domes are each welded to a ring with the present filler alloy, thereby forming the cryogenic tank. Welding parameters vary depending upon the technique selected. A preferred method is to weld the components using conventional gas tungsten arc welding. The surfaces to be welded should preferably be mechanically milled or chemically milled in a 100 g/l NaOH aqueous solution such that about 0.5 mm of the surface is removed. A 75% Ar/25% He inert gas cover at 14 l/min can be used. For a 1 mm diameter weld wire, a travel speed of 25 cm/min at a current of 170 Amps and a voltage of 12.5 volts produces high integrity weldments. If the weight of the tank needs to be decreased, conventional chemical milling could be used to reduce the thickness of the barrel in low service load areas. A typical solution for such milling is 103 g/l NaOH, 22 g/l sodium sulphide and 2.2 g/l sodium gluconate to make 1 liter of solution.

Weldments made with the present filler alloys as described above in Example 8 advantageously display increasing weldment toughness and strength with decreasing temperature. The cryogenic tank so fabricated can be cost effectively proof tested at room temperature. Because toughness and strength are each substantially the same or greater at cryogenic service temperatures than at the ambient proof test temperature, the tank can be safely used with minimal risk of toughness-limited or strength-overload-induced failures.

It is to be understood that the above-description of the present invention is susceptible to various modifications, changes and adaptations by those skilled in the art, and that such modifications, changes and adaptations are to be considered within the spirit and scope of the invention as set forth by the claims which follow.

What is claimed is:

1. An aluminum-base weld filler alloy consisting essentially of from 3 to 7 weight percent Cu, from 0.4 to 1.8 weight percent Li, less than about 0.01 weight percent Mg as an alloying addition, at least about 0.1 weight percent Ag, and the balance aluminum and incidental impurities.

2. An aluminum-base weld filler alloy according to claim 1, wherein the alloy further contains from 0.01 to 1.0 weight percent of at least one element selected from the group consisting of Zr, Ti, B, V, Hf, Mn, Cr, Zn, In, Ge, Sc and Be.

3. An aluminum-base weld filler alloy according to claim 2, wherein the at least one element is selected from Zr and Ti.

4. An aluminum-base weld filler alloy according to claim 3, wherein the Zr comprises up to about 0.2 weight percent and the Ti comprises up to about 0.3 weight percent.

5. An aluminum-base weld filler alloy according to claim 1, wherein the alloy contains Ag in an amount up to 0.8 weight percent.

6. An aluminum-base weld filler alloy according to claim 1, wherein the alloy consists essentially of from 3.5 to 5.5 weight percent Cu, from 0.6 to 1.2 weight percent Li and from 0.2 to 0.6 weight percent Ag.

7. An aluminum-base weld filler alloy according to claim 1, wherein the alloy consists essentially of from 4.0 to 5.2 weight percent Cu, from 0.8 to 1.1 weight percent Li and from 0.3 to 0.5 weight percent Ag.

8. An aluminum-base weld filler alloy according to claim 1, wherein the alloy is free of Mg.

9. An aluminum-base weld filler alloy according to claim 1, wherein the alloy is provided in the form of a weld wire.

10. A method for making an aluminum-base weld wire, the method comprising:

(a) providing an aluminum-base alloy consisting essentially of from 3 to 7 weight percent Cu, from 0.4 to 1.8 weight percent Li, less than about 0.01 weight percent Mg as an alloying addition, at least about 0.1 weight percent Ag, and the balance aluminum and incidental impurities; and (b) drawing the aluminum-base alloy to form the weld wire.

11. A method according to claim 10, wherein the alloy further contains from 0.01 to 1.0 weight percent of at least one element selected from the group consisting of Zr, Ti, B, V, Hf, Mn, Cr, Zn, In, Ge, Sc and Be.

12. A method according to claim 10, wherein the alloy contains Ag in an amount up to 0.8 weight percent.

13. A method according to claim 10, wherein the alloy consists essentially of from 3.5 to 5.5 weight percent Cu, from 0.6 to 1.2 weight percent Li and from 0.2 to 0.6 weight percent Ag.

14. A method according to claim 10, wherein the alloy consists essentially of from 4.0 to 5.2 weight percent Cu, from 0.8 to 1.1 weight percent Li and from 0.3 to 0.5 weight percent Ag.

15. A method according to claim 10, wherein the alloy is provided in the form of an extrusion.

16. A method according to claim 15, wherein the extrusion has a cross-sectional area that is reduced up to about 2 times during the drawing step.

17. A method according to claim 16, wherein the alloy is drawn in multiple passes.

18. A method for welding an aluminum alloy, the method comprising:

(a) providing at least one aluminum alloy; and (b) welding the at least one aluminum alloy with a weld filler alloy consisting essentially of from 3 to 7 weight percent Cu, from 0.4 to 1.8 weight percent Li, less than about 0.01 weight percent Mg as an alloying addition, at least about 0.1 weight percent Ag, and the balance aluminum and incidental impurities.

19. A method according to claim 18, wherein the aluminum alloy comprises Cu.

20. A method according to claim 19, wherein the aluminum alloy further comprises at least one element selected from Li and Mg.

21. A method according to claim 20, wherein the aluminum alloy further comprises at least one element selected from Ag and Zn.

22. A method according to claim 18, wherein the weld filler alloy further contains from 0.01 to 1.0 weight percent of at least one element selected from the group consisting of Zr, Ti, B, V, Hf, Mn, Cr, Zn, In, Ge, Sc and Be.

23. A method according to claim 18, wherein the weld filler alloy contains Ag in an amount up to 0.8 weight percent.

24. A method according to claim 18, wherein the weld filler alloy consists essentially of from 3.5 to 5.5 weight percent Cu, from 0.6 to 1.2 weight percent Li and from 0.2 to 0.6 weight percent Ag.

25. A method according to claim 18, wherein the weld filler alloy consists essentially of from 4.0 to 5.2 weight percent Cu, from 0.8 to 1.1 weight percent Li and from 0.3 to 0.5 weight percent Ag.

26. A method according to claim 18, wherein the welding produces a weldment having a composition consisting essentially of from 3 to 7 weight percent Cu, from 0.2 to 2.2 weight percent Li, from 0.2 to 2.0 weight percent Mg, and the balance Al and incidental impurities.

27. A method according to claim 18, wherein the welding produces a weldment having a composition consisting essentially of from 3.5 to 5.5 weight percent Cu, from 0.6 to 1.2 weight percent Li, from 0.2 to 0.8 weight percent Mg, and the balance Al and incidental impurities.

28. A method for forming a welded cryogenic container, the method comprising:

(a) providing separate component parts of the container; and (b) welding the separate parts together with a weld filler alloy consisting essentially of from 3 to 7 weight percent Cu, from 0.4 to 1.8 weight percent Li, less than about 0.01 weight percent Mg as an alloying addition, at least about 0.1 weight percent Ag, and the balance aluminum and incidental impurities.

29. A method according to claim 28, wherein the component parts of the container include an aluminum alloy comprising Cu.

30. A method according to claim 29, wherein the aluminum alloy further comprises at least one element selected from Li and Mg.

31. A method according to claim 30, wherein the aluminum alloy further comprises at least one element selected from Ag and Zn.

32. A method according to claim 28, wherein the component parts of the container are provided in the form of an extrusion, plate, sheet or a combination thereof.

33. A method according to claim 28, wherein the container is a tank for holding cryogenic material.

34. A method according to claim 28, wherein the weld filler alloy further contains from 0.01 to 1.0 weight percent of at least one element selected from the group consisting of Zr, Ti, B, V, Hf, Mn, Cr, Zn, In, Ge, Sc and Be.

35. A method according to claim 28, wherein the weld filler alloy contains Ag in an amount up to 0.8 weight percent.

36. A method according to claim 28, wherein the weld filler alloy consists essentially of from 3.5 to 5.5 weight percent Cu, from 0.6 to 1.2 weight percent Li and from 0.2 to 0.6 weight percent Ag.

37. A method according to claim 28, wherein the weld filler alloy consists essentially of from 4.0 to 5.2 weight percent Cu, from 0.8 to about 1.1 weight percent Li and from 0.3 to 0.5 weight percent Ag.

* * * * *